United States Patent [19]

Linder et al.

[11] Patent Number: 5,049,282

[45] Date of Patent: Sep. 17, 1991

[54] SEMIPERMEABLE COMPOSITE MEMBRANES

[75] Inventors: Charles Linder, Rehovot; Mara Nemas, Neve Monoson; Mordechai Perry, Petach Tikva; Reuven Ketraro, Rishon Letzion, all of Israel

[73] Assignee: Aligena AG, Basle, Switzerland

[21] Appl. No.: 507,566

[22] Filed: Apr. 11, 1990

[30] Foreign Application Priority Data

Oct. 30, 1989 [GB] United Kingdom ................ 8924412

[51] Int. Cl.$^5$ ............................................. B01D 61/08
[52] U.S. Cl. .................................... 210/651; 210/654; 210/490
[58] Field of Search ........... 210/651, 652, 490, 500.28, 210/500.36, 500.37, 654

[56] References Cited

U.S. PATENT DOCUMENTS 4,690,766  9/1987  Linder et al. .................. 210/500.28

*Primary Examiner*—Frank Spear
*Attorney, Agent, or Firm*—Wenderoth, Lind & Ponack

[57] ABSTRACT

Semipermeable composite membranes composed of a porous substrate and at least two layers of film-forming polymers coated thereon are provided, which comprise a first layer of monomeric or polymeric diazonium salts, which have been reacted with themselves and with an at least difunctional compound, and a second layer, which is chemically bonded to the first one, of a cross-linked, ionically charged hydrophilic polymer.

The membranes show good mechanical, physical and chemical stabilities and are useful in reverse osmosis and ultrafiltration processes, particularly for desalting solutions of low molecular weight organic compounds.

23 Claims, No Drawings

SEMIPERMEABLE COMPOSITE MEMBRANES

The present invention relates to the field of semipermeable composite membranes composed of at least two layers, the first of which is made from a diazonium salt of a monomer or polymer, formed and coated onto a more porous semipermeable membrane substrate and then stabilised by cross-linking. The second layer comprises a cross-linked, ionically charged hydrophilic polymer.

It is already known from the state of the art (U.S. Pat. No. 4,620,204) to prepare membranes which comprise a thin cross-linked hydrophilic film chemically bonded to a thicker more porous membrane. These membranes require reactive groups on the membrane to chemically bond the thin film to the said membrane and cross-link the membrane (e.g. with a reactive dyestuff). Without this chemical bonding the coated polymers cross-linked with a reactive dye for example have insufficient life time, especially at extreme pH-values and temperature, and are soluble in various organic solvents, such as N-methylpyrrolidone (NMP), dimethylformamide (DMF) or dimethyl-sulfoxide (DMSO).

One approach of coating a porous substrate (UF-membrane) with hydrophilic polymers for improving rejection is described in U.S. Pat. No. 4,125,462. The coating polymers are water soluble amines that are physically adsorbed and there is no attempt to cross-link or bind the coated layers.

These membranes with the coating alone decline in rejection with time; further they suffer from insufficient physical stability in that the coating is slowly washed away.

It has now been found that these difficulties and drawbacks adhered to the known composite membranes can be overcome by the composite membranes according to the present invention which comprise two layers of film-forming polymers coated onto a porous substrate: the first layer being applied to the substrate by coating it with a monomeric or polymeric diazonium salt solution, which diazonium salts react with themselves and are then cross-linked, and the second layer which is coated—as a rule—on the first one comprises a cross-linked, ionically charged hydrophilic polymer.

Therefore, it is one object of the present invention to provide new semipermeable composite membranes composed of a porous substrate and at least two layers of film-forming polymers coated thereon, which comprises a first layer of monomeric or polymeric diazonium salts, which have been reacted with themselves and with an at least difunctional compound, and a second layer, which is chemically bonded to the first one, of a cross-linked, ionically charged hydrophilic polymer.

Other objects of the present invention are processes for the manufacture of the inventive membranes (membrane films of cross-linked polymers on and inside the pores of porous substrates), as well as the use of these membranes in ultrafiltration and reverse osmosis processes, viz. in fields involving concentration and purification of liquids, e.g. separating salts from organic compounds or purifying (waste) water.

These and other objects of the present invention will be apparent from the following detailed description.

A process for the preparation of the inventive semipermeable composite membranes—which is a further object of the present invention as indicated hereinbefore—comprises modifying a porous substrate through a sequence of chemical treatments consisting essentially of steps (a) to (e), wherein step (a) is treating the substrate with a monomeric or polymeric diazonium salt,
step (b) is treating the product of step (a) with alkali,
step (c) is treating the product of step (b) with an at least difunctional compound,
step (d) is coating the product of step (c) with a hydrophilic polymer, and
step (e) is cross-linking the product of step (d) with an ionic, at least difunctional compound, wherein at least one of the polymers of step (d) or the at least difunctional compound of step (e) contains ionic groups.

More particularly, the inventive membranes are formed by first coating the substrate with a monomeric or polymeric diazonium salt which is made to condense with itself (in the presence of alkali) with the loss of the diazonium moiety forming covalent cross-links. Followed by a cross-linker containing at least two reactive groups and then the additional coating of a hydrophilic (or polyelectrolyte) polymer which may react with the cross-linkers on the first coating. The top portion of the second coating is finally also cross-linked preferably with an ionic, at least difunctional cross-linker. Thus the modification process which has several variations, is primarily based on the following sequence that physically or electrostatically adsorbs a diazonium polymer or monomer layer to the substrate. The said polymer condenses with itself and is further cross-linked and functionalised leaving reactive groups from the cross-linker for an additional chemical binding of a second polymer. This second polymer layer is then charged ionically and cross-linked.

Therefore, treating in step (c) means, on the one hand, the cross-linking of the product of step (b), and, on the other hand, the functionalising of the cross-linked product to provide (additional) reactive sites for a chemical reaction with the polymer coating of step (d).

The porous substrates (membrane substrates or basic membranes) used inventively comprise for example the vast number of ordinary reverse-osmosis (RO), microfiltration (MF) or preferably ultrafiltration (UF) membranes with average pore sizes varying from 1 to 500 nm. The preferred range, however, is 1 to 100 nm and most preferred 2 to 20 nm for the achievement of optimum rejection with flux. In addition, a minimum porosity of 10% is preferred for sufficiently high flux.

Any of the known membrane forming materials may be used for preparing the porous substrate, as for example, organic polymeric membranes produced from polyacrylonitriles and copolymers on the basis of acrylonitrile, polyamides, polyvinyl chlorides and copolymers on the basis of vinyl chloride, cellulosics, epoxy resins, polyaryleneoxides, polycarbonates, polyetherketones, polyheterocyclics, copolymers containing in part heterocyclic rings, polyvinylidene fluorides, polytetrafluoroethylenes, polyesters, polyimides, aromatic polysulfones, sulfonated derivatives of aromatic polysulfones (preferably less than 1.5 or most preferably below 1.0 eq sulfone groups per kilogramm of polymer), polyelectrolyte complexes, and polyolefines, they all may be used as both homo- and copolymer combinations. In addition UF-ceramic substrates may be used.

Preferred polymers are cellulosics, polyacrylonitriles, aromatic polysulfones, polyamides, polyvinylidene fluorides or polytetrafluoroethylenes, polyetherketones, UF-ceramic substrates and the sulfonated derivatives of polyether ketones and polysulfones.

Membrane casting may be performed by any number of casting procedures cited in the literature (for example U.S. Pat. No. 4,029,582, GB-A-2,000,720, U.S. Pat. No. 3,556,305, U.S. Pat. No. 3,615,024, U.S. Pat. No. 3,567,810). Thus, the polymer or its derivatives, may be dissolved in a suitable solvent or mixture of solvents (for example NMP, DMF, DMSO, hexamethylphosphortriamide, N,N-dimethylacetamide, dioxane), which may or may not contain co-solvents, partical solvents, non-solvents, salts, surfactants or electrolytes, for altering or modifying the membrane morphology and its flux and rejection properties (i.e. acetone, ethanol, methanol, formamide, water, methylethylketone, triethyl phosphate, sulfuric acid, hydrochloric acid, partial esters of fatty acids and sugar alcohols or their ethylene oxide adducts, sodium dodecyl sulfate (SDS), sodium dodecylbenzene sulfonate, sodium hydroxide, potassium chloride, zinc chloride, calcium chloride, lithium nitrate, lithium chloride, magnesium perchlorate, etc.).

The casting solution may be filtered by any of the known processes (i.e. pressure filtration through microporous filters or by centrifugation), and cast on a support such as e.g. glass, metal, paper or plastic from which it may then be removed. It is preferred, however, to cast on a porous support material from which the membrane is not removed. Such porous supports may be non-woven or woven clothes such as of cellulosics, polyethylenes, polypropylenes, polyamides (nylon), polyvinyl chlorides and its copolymers, polystyrenes, polyethylene terephthalates (polyesters), polyvinylidene fluorides, polytetrafluoro ethylenes, polyether ketones, polyether-ether-ketones, glass fibers, porous carbon, graphite, inorganic membranes based on alumina and/or silica, optionally coated with zirkonium oxide or other oxides, or ceramics. The membrane may alternatively be formed as flat sheet or as a hollow fiber or tubulet, not requiring a support for practical use.

The concentration of polymer in the casting solution may vary as a function of its molecular weight and of the further additives between 5 to 80%, but preferably between 10 and 50% and most preferred between 15 to 30%. The temperature of casting may vary from $-20°$ to $100°$ C., but the preferred range is between $0°$ and $60°$ C., varying as a function of the polymer, its molecular weight, and the cosolvents and additives, in the casting solution.

The polymer casting solution may be applied to the above mentioned supports by any of the well known techniques, known to those practised in the art. The wet film thickness may vary between 5 to 2000 micron. The preferred range being 50 to 800 micron and the most preferred 100 to 500 micron. The wet film and support may then be immersed immediately, or after a partial evaporation step (from 5 seconds to 48 hours) at ambient condition or elevated temperature, or vacuum or any combination thereof into a gelling bath of a non-solvent. Such baths are usually water, or water with a small percentage of a solvent (for example DMF or NMP) and/or a surfactant (for example sodium dodecyl sulfate, SDS) at a temperature of $0°$ to $70°$ C. An example of a commonly used gelling bath is water with 0.5% SDS at $40°$ C. In another mode of forming membranes, a polymer solution containing a component that may be leached out in water or another solvent, is cast and dried before immersion. After immersion, leachable material is removed resulting in a porous membrane. In a third variation, a polymer solution without any leachable materials is cast and taken to dryness, resulting in a porous membrane by virtue of the physico-chemical properties of polymeric material-solvent combination or by a subsequent chemical reaction that creates pores. All the above methods may be used to form membranes (substrates) for further modification as described hereinafter.

The inventively used diazonium salts can be obtained by diazotization of primary amino group-containing monomeric or polymeric, aromatic or preferably aliphatic compounds.

Low molecular weight polyamines used to form diazonium salts may be aromatic, heterocyclic or preferably aliphatic. The aromatic compounds should contain one or more primary amino functions on a single aromatic, fused aromatics of two, three or four aromatic rings or non fused aromatic rings. Examples are aniline, phenylene diamines such as m-phenylene diamine or p-phenylene diamine, aminonaphthalenes such as diamino naphthalene or 1-amino-8-hydroxy-3,6-disulfonic naphthalene.

An example of a heterocyclic amine is 2,6-diaminopyridine. The low molecular weight aliphatic polyamines may be acyclic or cyclic and they may contain further heteroatoms, such as oxygene, for example as hydroxyl groups or in form of an -O-ether-bridge. Examples are alkylene diamines of the formula $H_2N(CH_2)_{1-10}NH_2$, ether amines of the formula $H_2N(CH_2)_{2-4}O(CH_2)_{2-4}NH_2$ and aliphatic hydroxyl groups containing amines (alkanolamines) of the formula $HOCH_2CH(OH)CH_2NH(CH_2CH_2NH)_{1-3}H$ (cf. EP-A-8 945).

Primary amino groups containing polymers are converted into polymeric diazonium salts and are used to coat the porous (semipermeable) membrane substrate. Preferred are polyfunctional oligomers or polymers which contain active hydrogen atoms bound to nitrogen. The nitrogen atoms may be present as aliphatic (acyclic or cyclic), aromatic or heterocyclic amino groups, which can be primary, secondary or tertiary. A certain amount of primary amino groups has to be present.

Examples of such polymers are polyethyleneimine (M.W. 150 to 1,000,000), which can be partially alkylated or otherwise modified, polyvinylamines (M.W. 1000 to 2,000,000), vinylamine/vinylsulfonate copolymers, polyvinylaniline, polybenzylamines, polyvinylimidazoline, amino modified polyepihalohydrin (described in GB-A-1,558,807), polydiallylamine derivatives, polymers containing piperidine radicals (described in GB-A-2,027,614), amino (aminalkyl) substituted polysulfones, amino (aminoalkyl) substituted polyarylene oxides (e.g. amino methylated polyphenylene oxide), polyamide-polyamine-epichlorohydrin condensation products, or polymers of 2-aminomethylmethacrylate. The above polymers may be in part a copolymer or a polymer containing other monomeric units, block polymers or graft polymers. If they are copolymers the other monomeric units may or may not contain ionic groups such as $-SO_3^\ominus$, $-COO^\ominus$ or $-NR_3^\oplus$).

One preferred polymer comprises poly-aliphatic (acyclic or cyclic) amines. Polyethyleneimine is an example of this group. The range of molecular weights may be between 150 to 2,000,000, but preferably between 1000 and 200,000 and most preferred between 10,000 and 70,000. Low molecular weight polymers or oligomers (150 to 1000) may be used, but the increase in solute rejection of the final membrane is not as great when higher molecular weight polymers are used.

In another preferred case, one can use water soluble amphoteric or block mosaic polymers containing both cationic and anionic group, together with reactive amino (primary) amino functions.

The above monomers or polymers are converted to the diazonium salts by dissolving the polymer in a solution of e.g. sodium nitrite and adjusting the pH of the solutions with hydrochloric or sulfuric acid to less than a pH of 2 and preferably to a pH between 1.5 and 0.5. Though this is the preferred method any other method of producing diazonium salts may be used. Water is the preferred solvent for this diazonium salt formation, though other solvents, such as low molecular weight alcohols or ketones may be used alone or in combination with water. The range of monomer or polymer concentration may be from 0.1 to 30%, but preferably between 0.5 and 15%, and most preferred between 0.5 and 5%.

After immersion of the membrane substrate in the polydiazonium salt solution the coated membrane is removed, drained and immersed in a more basic pH solution. pH-values above 7 and most preferred above pH 10 (pH-range of 7 to 12) give the best results. The time of immersion in the basic solution may vary from one 30 seconds to 48 hours, but most preferably from 1.0 minutes to 4 hours.

The diazonium salts—as indicated hereinbefore—can react with themselves, e.g. by the loss of the diazo (—N=N—) group under the influence of water and alkali (e.g. alkali metal or alkaline metal hydroxides such as lithium, sodium, potassium or calcium hydroxide) and form covalent bonds which may be intermolecular or intramolecular ones. The present invention is not limited to this mechanism.

The monomeric and polymeric diazonium salts are thus made to undergo a certain self-condensation. These particular (polymeric) self-condensation products form—after they have been cross-linked and functionalised by an at least difunctional compound—the unique first layer in the inventive composite membranes which highly contributes to the superior effects of said membranes.

The so-called self-condensation of the diazonium salts can be carried out separately and the condensation products are then applied (coated) to (onto) the substrate, or and this is the preferred embodiment, the self-condensation is carried out in-situ, that is in the presence of the membrane substrate.

After the immersion of the membrane (coated with the first layer) in the alkaline bath, it is rinsed at pH 4 to 7 to rinse off unreacted material and to adjust the pH back to neutral conditions.

To the above coated layer at least difunctional compounds, which may be ionic or preferably non-ionic ones are applied. They possess cross-linking properties and can enter into chemical bonding with the condensed polymer (obtained from the diazonium salts) and optionally substrate. Further they can functionalise the condensed polymer to provide reactive sites for chemically binding the two polymer layers together.

These compounds, which have at least two functional groups, possess their reactivity by virtue of reactive multiple bonds, or epoxide, aziridine, aldehyde, imidate, isocyanate, isothiocyanate, hydroxyl, (carboxylic acid) anhydride, or N-methylol groups (these bonds or groups may be further substituted); or said compounds contain substituents detachable as tertiary amines or preferably as anions. Combinations of these are also possible.

The compounds may contain, for example, the groupings

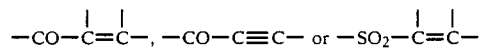

as a multiple bond to which further substituents can be added on. The isocyanate or isothiocyanate group can also be considered as a group of this type. They can contain quaternary ammonium groups, which are split off as tertiary amines, for example, a trimethylammonium or pyridinium group. However, they preferably contain substituents with groups that split off as an anion, and preferably contain a reactive halogen atom, as the reactive group. These leaving groups possess their reactivity by virtue of, for example, the influence of electrophilic groups, such as the —CO— or —SO₂— group in saturated aliphatic radicals (acyl halides). They also possess their reactivity by virtue of the influence of a quaternary nitrogen atom, such as in the group

or in aromatic radicals by virtue of the influence of electrophilic groups in the o- and p-position, for example, nitro, hydrocarbonsulfonyl, or hydrocarbon carbonyl groups, or of the bond to a ring carbon atom, which is adjacent to a tertiary ring nitrogen atom, as in halogenotriazine or halogenopyrimidine radicals.

The at least difunctional compounds may be selected from the following groups:

A. s-Triazines, containing at least two identical or different halogen atoms bonded to carbon atoms, for example, cyanuric chloride, cyanuric fluoride, cyanuric bromide and also their primary condensation products with, for example, water, ammonia, amines, alkanols, alkylmercaptans, phenols or thiophenols.

B. Pyrimidines, containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxy-methyl, alkylsulfonyl, carboxamide or sulfonamide group, but preferably by halogen, for example, chlorine, bromine or fluorine. Particularly suitable halogenopyrimidines are 2,4,6-trichloro- and 2,4,5,6-tetrachloropyrimidines; further derivatives of pyrimidine similar to those of (A) above.

C. Halogenopyrimidinecarboxylic acid halides, for example, dichloropyrimidine-5- or -6-carboxylic acid chloride.

D. 2,3-Dihalogeno-quinoxaline-, -quinazoline- or -phthalazine-carboxylic acid halides or -sulfonic acid halides, such as 2,3-di-chloroquinoxaline-6-carboxylic acid chloride or acid bromide.

E. 2-Halogeno-benzthiazole- or -benzoxazole-carboxylic acid halides or -sulfonic acid halides, such as 2-chloro-benzthiazole- or -benzoxazole-5- or -6-carboxylic acid chloride or -5- or -6-sulfonic acid chloride, and F. Halogeno-6-pyridazonyl-1-alkanoyl halides or 1-benzoyl halides, 4,5-dichloro-6-pyridazonyl-1-propionyl chloride or -1-benzoyl chloride.

Further compounds which contain at least two reactive substituents which can be employed are, for example:

G. Anhydrides or halides of aliphatic, α,β-unsaturated mono- or dicarboxylic acids having preferably 3 to 5 carbon atoms, such as maleic anhydride, acryloyl chloride, methacryloyl chloride and propionyl chloride.

H. Carboxylic acid anhydrides or halides of aliphatic mono- or dicarboxylic acids having preferably 3 to 10 carbon atoms, or of aromatic carboxylic acids, containing reactive halogen atoms, for example, chloroacetyl chloride, β-chloropropionyl chloride, α,β-dibromopropionylchloride, α-chloro- or β-chloro-acryloyl chloride, chloromaleic anhydride and β-chloro-crotonyl chloride, and fluoronitro- or chloro-nitro-benzoic acid halides or -sulfonic acid halides in which the fluorine atom or the chlorine atom is in the o-position and/or p-position relative to the nitro group.

I. Carboxylic acid N-methylolamides or reactive functional derivatives of these methylol compounds. Carboxylic acid N-methylol-amides are in particular N-methylol-chloroacetamide, N-methylol-bromoacetamide, N-methylol-α,β-dichloro- or -dibromo-propionamide, N-methylolacrylamide and N-methylol-α-chloro- or -α-bromoacrylamide. Reactive derivatives of the carboxylic acid N-methylolamides, are for example, the corresponding N-chloro-methyl- or N-bromo-methylamides.

J. Free or etherified N-methylolureas or N-methylolmelamines, for example, N,N-dimethylolurea, N,N-dimethylolurea dimethyl ether, N,N'-dimethylolethylene- or -propylene-urea, 4,5-dihydroxy-N,N'-dimethylolethyleneurea or 4,5-dihydroxy-N,N'-dimethylol-ethyleneurea dimethyl ether and di- to -hexamethylolmelamine, trimethylolmelamine dimethyl ether, pentamethylolmetlamine pentamethyl or hexamethyl ether.

K. Condensation products of dialkylalkanes containing at least one phenolic hydroxyl group and halogenohydrines, for example, the diepoxide obtained from 2,2-bis(4'-hydroxyphenyl)-propane and epichlorohydrin, as well as glycerol triglycidyl ethers and also corresponding diaziridines.

L. Di-aldehydes, for example, glutaraldehyde or adipaldehyde.

M. Diisocyanoates or diisothiocyanates, such as alkylene ($C_2$–$C_4$)-diisocyanate, e.g. ethylene diisocyanate, phenylene- or alkyl($C_1$–$C_4$)-substituted phenylenediisocyanates, e.g. phenylene-1,4-diisocyanate or toluene-2,4-diisocyanate, or phenylene-diisothiocyanates, for example, phenylene-1,4-diisothiocyanate, or N. Further reactive compounds, such as trisacryloyl-hexahydro-s-triazine, epoxides or aziridines.

Non-ionic at least difunctional compounds which are preferred and have proved particularly advantageous are halogeno-diazines or -triazines containing at least two reactive substituents, as well as compounds containing isocyanate or isothiocyanate groups. Tri- and tetrachloropyrimidine and in particular cyanuric chloride have proved particularly advantageous.

The cross-linking of the polymeric species of the first layer of the inventive composite membranes can be carried out—although less preferred—with ionic, at least difunctional compound, too. These may contain the same reactive moieties or groups as the non-ionic cross-linking agents.

Therefore, the ionic, at least difunctional compounds contain as functional moieties multiple bonds or epoxide, aziridine, aldehyde, imidate, isocyanate, isothiocyanate, anhydride, hydroxyl, or N-methylol groups, or said at least difunctional bompound contains substituents detachable as anions or tertiary amines, and as ionic groups sulfonic acid, sulfato, carboxylic acid, ammonium, sulfonium or phosphonium groups.

Among the at least difunctional compounds that contain substituents detachable as anions, di- and triazines containing at least two halogen (chlorine, fluorine) atoms, sulfonic acid halides and di- and halides (chlorides) of di- and tricarboxylic acis, respectively, may be mentioned.

While many of the above reagents can be applied in aqueous solutions within a narrow range of pH and temperature, the acyl halides must be dissolved in aprotic solvents.

Preferred ionic, at least difunctional compounds useful as cross-linking agents are, however, ionic or charged compounds containing vinylsulfonyl, triazinyl, pyrimidinyl or 1,4-quinoxalinyl radicals. Reactive azo dyes (containing sulfonic acid groups, carboxyl groups or ammonium groups) belong to this class as do non-colored compounds with the aforementioned functions. An effective reagent may cross-link via chemical bonds, electrostatic interactions of ionic groups, and by chelation or coordination of polymeric functions with metal ions. The preferred mode of cross-linking is via a covalent bond, though the other two modes may also be used. In some cases all three modes of cross-linking may be operative via application of a single component (e.g. dye of formula (1), or may be reached by sequential or parallel application of 2 or 3 different compounds (dyestuff and metal salt).

Multivalent metal salts that may find application in cross-linking said film via chelation or coordination bonds, are for example, $CuSO_4$, $CrCl_3$ and $FeCl_3$. These salts may be applied alone, in combination with each other, or in combination with covalent (ionic) binding compounds.

The ionic reactive dyes, which can belong to various categories, are for example, anthraquinone, formazan or preferably azo dyes, which are optionally metal complexe. Suitable reactive groups (which are part of the dyes) are the following: carboxylic acid halide groups, sulfonic acid halide groups, radicals of α,β-unsaturated carboxylic acids or amides, for example, of acrylic acid, methacrylic acid, α-chloroacrylic acid, α-bromoacrylic acid, or acrylamide radicals of preferably low halogenoalkylcarboxylic acids, for example, of chloroacetic acid, α,β-dichloropropionic acid or α,β-dibromopropionic acid; radicals of fluorocyclobutanecarboxylic acids, for example of tri- or tetra-fluorocyclobutane-carboxylic acid; radicals containing vinyl-acyl groups, for example, vinylsulfone groups or carboxyvinyl groups; radicals containing ethylsulfonyl ($—SO_2CH_2CH_2OSO_2OH$, $—SO_2CH_2CH_2Cl$) or ethylamino sulfonyl groups ($—SO_2NHCH_2CH_2OSO_2OH$) and halogenated heterocyclic radicals such as dihaloquinoxalines, dihalopyridazonyl, dihalophthalizines, halobenzothiazoles and preferably halogenated pyrimidines or 1,3,5-triazines, such as dihalotriazines, 2,4-dihalopyrimidines or 2,4,6-trihalopyrimidines. Suitable halogen atoms are fluorine, bromine and especially chlorine atoms.

Ionic groups are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups.

The preferred reactive groups present in the ionic, at least difunctional compounds are dichlorotriazinyl, 2,4-dichloropyrimidinyl, 2,3-dichloroquinoxaline-6-carbonyl, 4,5-dichloro-pyridazonylpropionyl, 1,4-dichlorophthalazine-6-carbonyl, chlorobenzothiazole linked to the dye via —CONH—, —SO$_2$NH—, —NH—Ar—N≡N— (Ar=phenylene or naphthylene), 5-chloro-4-methyl-2-methylsulfonyl, pyrimidinyl, vinylsulfonyl, or precursors, which are convertible by alkaline treatment into vinylsulfonyl radicals, such as β-sulfato ethylsulfonyl, β-sulfatoethyl aminosulfonyl, β-chloroethylsulfonyl or β-sulfatopropionamido.

Mostly preferred are reactive compounds (azo dyestuffs) containing sulfonic acid (—SO$_3$H) or carboxyl (—COOH) groups (either group may also be present in salt form, such as alkali metal salt (sodium salt)) and as functional moieties vinylsulfonyl (including the β-sulfatoethylsulfonyl, β-chloroethylsulfonyl or β-sulfatoethylaminosulfonyl radical), halogenated triazinyl (dichlorotriazinyl), halogenated pyrimidinyl (2,4-dichloropyrimidinyl) or halogenated 1,4-quinoxalinyl radicals.

The ionic or non-ionic at least difunctional compounds can be applied from 0.1 to 20% aqueous solutions (suspensions) to the coated polymer. Preferably these solutions contain 0.5 to 10% or 0.5 to 5% by weight of the cross-linking agents. Their proportion to the coated membrane is about (0.5 to 10):1, preferably (0.5 to 5):1.

By way of an example for the reaction of diazonium coating made from polyethyleneimine coating (containing hydroxyl and amino groups) when, e.g. cyanuric chloride is used, with an aqueous (aqueous-organic (acetone)) solution (suspension) of this reagent which (solution) can contain 0.5 to 5 parts of cyanuric chloride per part of membrane. The reaction temperature should be kept below 4° C., for example, at 0° C., in order to prevent hydrolysis of the cyanuric chloride; the pH-value range is approximately between 8 and 11 and the reaction time can be from 1 minute to 5 hours.

Non-ionic cross-linking agents can be used together with ionic ones.

Unlike the state of the art practised in the manufacture of composite RO-membranes, the cross-linking for both the non-ionic and the ionic compounds preferably is carried out in an aqueous solution. Thus, water soluble or partially soluble at least difunctional reagents are found to give good results.

After the application of the cross-linker a second polymer coating is applied. In this coating the hydrophilic polymers are used to further coat the semipermeable membrane substrate. The preferred polymers are aliphatic or aromatic polyfunctional oligomers or polymers which contain active hydrogen atoms bound to nitrogen, oxygen and/or sulfur atoms (amino, hydroxyl and/or thiol groups). The nitrogen atoms may be present as aliphatic (acyclic or cyclic), aromatic, or heterocyclic amino groups, which can be primary, secondary or tertiary. Or alternatively, but less preferred, they may be polymers of hydroxyl or thiofunctions. Examples of such polymers are polyethyleneimine (PEI) (M.W. 150 to 1,000,000), which can be partially alkylated or otherwise modified, polyvinylamines (M.W. 1000 to 2,000,000), vinylamine/vinylsulfonate copolymers, polyvinyl alcohols (M.W. of 2000 to 200,000) or partially esterified (acetylated) polyvinyl alcohols, cellulosics, polybenzylamines, polyvinylanilines, polyvinylmercaptans, polyvinylimidazolines, polypiperidines, polydiallylamine derivatives (GB-A-2,067,614), amino modified polyepihalohydrin (GB-A-1,558,807), amino polysulfones, aminoalkyl polysulfones, amino polyarylene oxides, aminoalkyl polyarylene oxides, e.g. amino methylated polyphenylene oxide, polyamide-polyamine-epichlorohydrin condensation products, the condensation products of dicyandiamide, amine salts (ammonium chloride) and formaldehyde, or polymers of 2-hydroxyethyl or 2-aminoethyl-methacrylates. Also of interest are the polymers prepared by using hydrophilic amines (EP-A-8945).

The above polymers may be in part a copolymer or a polymer containing other monomeric units, block polymers or graft polymers. If they are copolymers the other monomeric units may or may not contain ionic groups (—SO$_3^\ominus$, —COO$^\ominus$, —NR$_3^\oplus$).

One preferred polymer comprises poly-aliphatic (acylic or cyclic) amines. Polyethyleneimine is an example of this group. The range of molecular weights may be between 150 to 2,000,000, but preferably between 1000 and 200,000 and most preferred between 10,000 and 70,000. Low molecular weight polymers of oligomers (150 to 1000) may be used, but the increase in solute rejection of the final membrane is not as great when higher molecular weight polymers are used.

In another preferred case, water soluble amphoteric or block mosaic polymers containing both cationic and anionic groups, together with a reactive function (for example, —NH$_2$ or —OH groups) for reaction with the polyfunctional cross-linking agents are useful for forming a mixed charge second layer. This type of membrane is particularly useful for separating salt from relatively low molecular weight organic solutes. An example of such a coating polymer is poly(vinylamine-vinyl sulfonate) or partially quaternized derivatives.

Water is the preferred solvent for the aforementioned molecules, though other solvents such as low molecular weight alcohols or ketones may be used alone or in combination with water. The range of polymer concentration may be from 0.1 to 80%, but preferably between 1 and 30%, and most preferred between 1.0 and 15%. Liquid polymers can be used without solvents. The concentration of polymer needed to achieve optimum rejection/flux characteristics is a function of the molecular weights of the polymer and of molecular dimensions, membrane porosity and pore size, temperature, time of immersion, pH and subsequent washing steps. These factors (together with a rinse step after immersion) control the thickness of the polymer layer deposited on the membrane. The temperature of the polymer solution during membrane immersion may vary from 0° to 90° C. The optimum temperature is a function of adsorption rates. The time of immersion may vary between 1 minute to 48 hours as a function of the temperature, pH, concentration, and the molecular weight, the dimensions and solution properties of the coating polymer. For example, at a pH of 8.0 and room temperature 10% polyethyleneimine in water coats a polysulfone membrane in 1 to 5 minutes, adequately for the practice of the present invention. On the other hand, polyvinylaniline (poly-aminostyrene) should be used for 1 hour in immersion to achieve optimum flux-rejection characteristics.

The pH-value of the polymer solution may be adjusted to control the solubility of the polymer, the rate of reaction of the polymer to substrate and the quantity of polymer adsorbed to the surface. Thus, for amines, a pH-value above 7.0 increases nucleophilic reaction rates, and for membrane modifications a pH range of 7.0 to 10.0 was found to be optimum in most cases, though higher or lower pH-values could also be used. If more acidic pH-values are used to improve solubility of the coating polymer, a given time is allowed for adsorption of the polymer to the membrane and then the pH-value is increased above 7.0 for binding.

After immersion the membrane coated with the second layer is rinsed in water to remove excess polymer. This step is a function of the coating polymers solution adsorption properties and concentration in solution and membrane porosity. The time of rinsing may vary from one minute to 48 hours, but most preferably from 30 minutes to 4 hours for a 10% PEI solution used for 5 minutes. Excessive washing or rinsing results in membranes with lower than maximum rejection, but still higher than the unmodified membrane. Shorter rinsing time leaves a relatively thick deposit of polymer and results in relatively low fluxes. The pH-value and temperature of the rinsing solution may vary between 1.0 and 12, and 0° to 100° C., respectively. Shorter rinsing times are requires at the higher temperatures, and may also vary as function of the pH-value.

After the second coating the membrane is again cross-linked with preferably ionic at least difunctional compounds. They possess cross-linking properties and can enter into chemical bonding with both polymer layers. These compounds, which hat at least two functional groups, are chosen from the previously described class of ionic cross-linkers. The method of application is also as previously described.

The ionic at least difunctional cross-linking agents serve to introduce positive or negative charges (ionic groupings) into the membrane surface and/or the pores and to cross-link the membrane, and is effected in one or two stages.

The one-stage process means that the compound carrying the charge and the so-called fixing agent (for example, alkali) is used in one bath.

The two-stage process comprises first the step involving the adsorption of the compound carrying the charge and then, in a separate reaction solution, the fixing step (chemical reaction between the polyfunctional compound and the coating polymer). The two-stage process is preferred since, on the one hand, the concentration of the at least difunctional compound in the adsorption solution can be kept lower and a solution of this type can optionally be used several times, and on the other hand, the total reaction time is shorter than in the case of the one-stage process.

In the two-stage process, the concentration of e.g. a reactive dye in aqueous solution can be about 0.5 to 3%; the adsorption is carried out, for example, at temperatures of 20° to 35° C. over a period of 2 to 60 minutes; the pH-value can be 4 to 8. Fixing can then be carried out in an aqueous solution, the pH of which has been adjusted from 9 to 12, and the reaction time can be about 30 minutes. The pH is adjusted to the desired value using any desired inorganic (sodium carbonate) or organic bases.

If there are already ionic groups present in the coating polymers (anionic groups or anionic and cationic groups such as in amphoteric polymers) that form the second layer, the introduction of further charges into the surface of the membrane is not necessary; a cross-linking step with non-ionic cross-linking agents is sufficient. The second (top) layer of the inventive membrane, however, should always contain ionic charges, as hereinbefore defined.

The inventive membranes which contain at least at the membrane surface (so-called second layer) an oligomer or polymer modified by an azo dye containing sulfonic acid groups, are particularly valuable and versatile in use. The azo dye can also contain a metal, for example, copper, bonded as a complex.

Depending on the intended application, the inventive membranes can be in various (flat or tubular) forms, for example, in the form of sheets, leaves or tubes, or in the form of pockets, bags, cones or of hollow fibres. When subjected to severe pressure, the membrane can, of course, be protected by non-woven supports, supports made of textile fibres or paper, wire screens or perforated plates and tubes (modules). Within the range indicated further above, the pore size can be varied by means of different temperatures and can likewise be suited to the particular application. Thus, for example, by subjecting the membrane to heat treatment (50° to 150° C.) before or after their chemical modification it is possible to change the pore size and thus the flux and the rejection of the membranes.

Compared with known modified membranes, the inventive membranes show good mechanical, physical and chemical stabilities, such as pressure, compaction, temperature, solvent, pH and (biological) degradation resistance.

They further show a significant improvement in membrane rejection with minimal flux decline. Combined with a greater rejection stability, that is, the decline in rejection with time is reduced to a minimum. This improved performance can be derived from the first layer of the inventive composite membrane comprising the self-condensed polymer species which are cross-linked and by which penetration of subsequent layers into the smallest pores of the support is prevented.

The final inventive membrane is useful in RO and UF and especially for applications in the range of pressures (5 to 50 bar) and cut-offs (100 to 2000 MW) associated with membranes between RO and UF, with average pore sizes of between 1 to 500 A, preferably 10 to 100 A.

The use of the inventive semipermeable composite membranes—which is an other object of the present invention—comprises in general processes for separating (ultrafiltration or reverse osmosis processes) solutes from a solution which comprises disposing the solution having an osmotic pressure on one side of the inventive composite membrane, and filtering it through the membrane by applying a hydraulic pressure, being greater than the osmotic pressure of said solution, against said solution and said membrane.

The following applications (which can be characterised as separating concentrating or purifying methods)

in particular are advantageous for the membranes according to the invention:
1. The separation of low molecular organic and metal organic ionic substances from by-products from a reaction mixture and other substance which are contained therein, for example from salts, such as sodium chloride, sodium sulfate or sodium acetate (cut-off level about 300).
2. The purification of effluents which are obtained from the production and use of dyes and fluorescent brighteners.
3. The separation of ionic molecules (salts) from aqueous solutions which contain metal complexes, surfactants, dyes or proteins, the results obtained in this case being better, with regard to the efficiency (permeability/flux per unit time) and the separating effect, than those obtained with known membranes.

The separation effect (the rejection) of the membranes can be measured as follows: a circular membrane with a surface area of 13 cm², resting on a sintered stainless steel disc, is used in a cylindrical cell made of stainless steel. 150 ml of the solution (to be tested), which contains the substance to be tested in the concentration $C_1$ (g of substance per g of solution), are introduced onto the membrane in the steel cylinder and, using nitrogen, subjected to pressure of 14 bars. The solution is stirred magnetically. The liquid which collects on the outlet side of the membrane is examined to determine its content (concentration) $C_2$ of the substance to be tested, 3 samples of 5 ml each being taken from the start of the experiment. In general, the amount which flows through the membrane and the composition of the 3 samples are constant. The rejection can be calculated from the values obtained, using the equation:

$$R = \frac{C_1 - C_2}{C_1} \cdot 100\%$$

The amount of the material passed through the membrane per surface and time unit is found to be:

$$F = V \cdot S^{-1} \cdot t^{-1}$$

V: volume
S: membrane surface area
t: time

F is approximately expressed in $m^3 \cdot m^{-2} \cdot d^{-1}$, i.e. the number of cubic meters per square meter surface area of the membrane and per day, or in $l/m^2 \cdot h$, i.e. litres per square meter surface area of the membrane per hour.

In addition to the measurement on flat membranes, measurements on tubular membranes 60 cm long, and with an outer diameter of 1.4 cm are also carried out. For this purpose, these tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent or laminar flow, under pressure. The flow rate is kept constant at 10 to 15 liters per minute. The rejection (R) and the flux (F) are calculated in the same way as for the flat membranes.

In the following examples, the compounds of formula (1) to (6) can be used as reactive agents for cross-linking and charging the second polymer layer, while the dyes of formula (7) and (8) can be used in test solutions. Parts and percentages are given by weight—if not otherwise indicated. The temperature is indicated in degrees Centigrade.

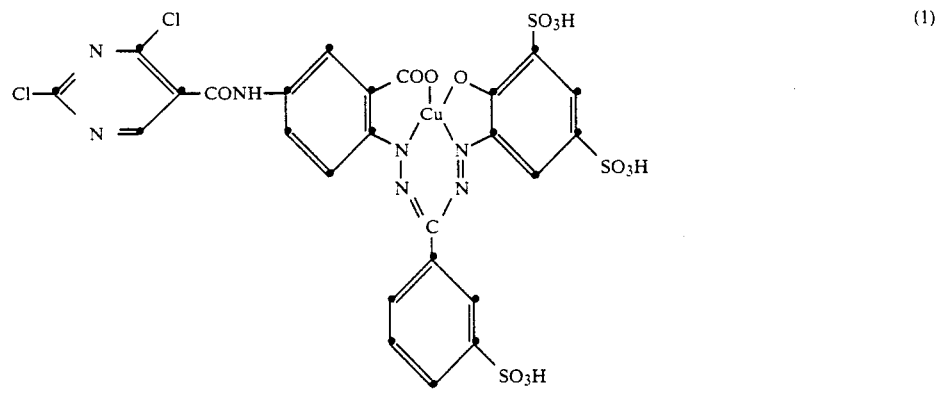

(1)

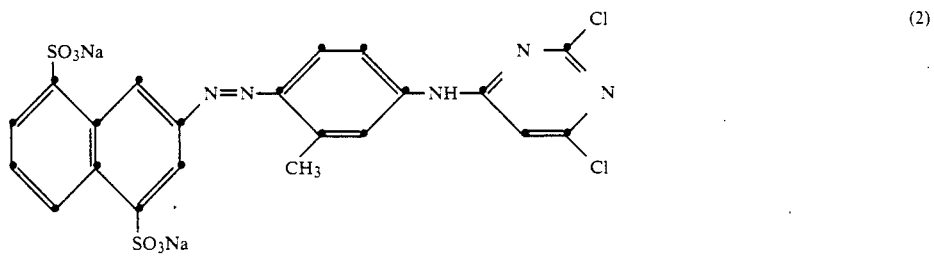

(2)

-continued
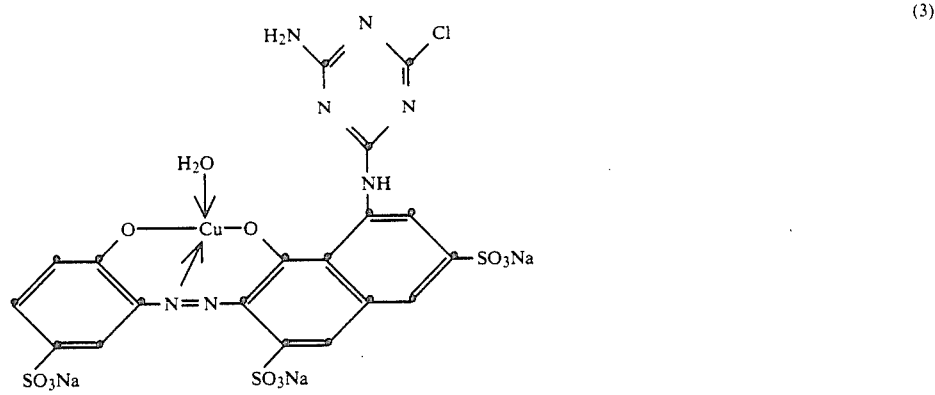
(3)
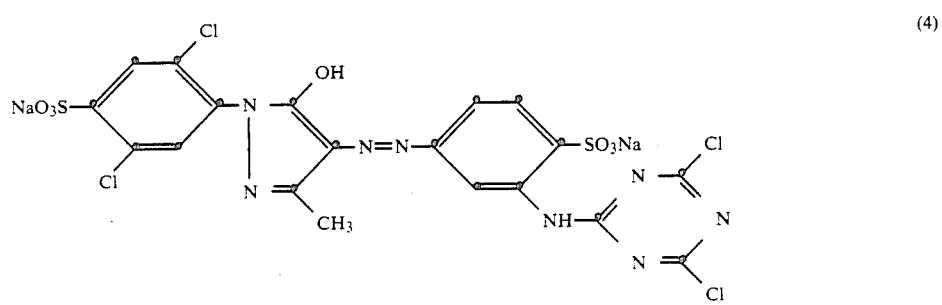
(4)
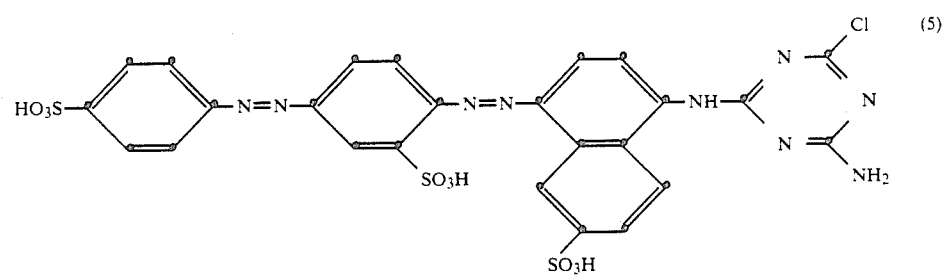
(5)
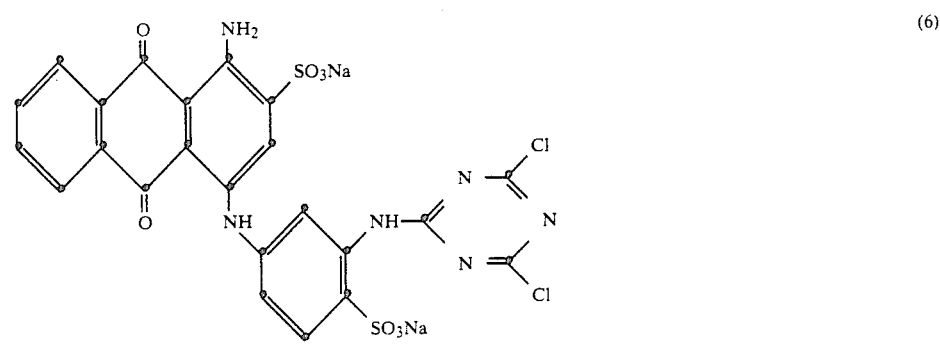
(6)
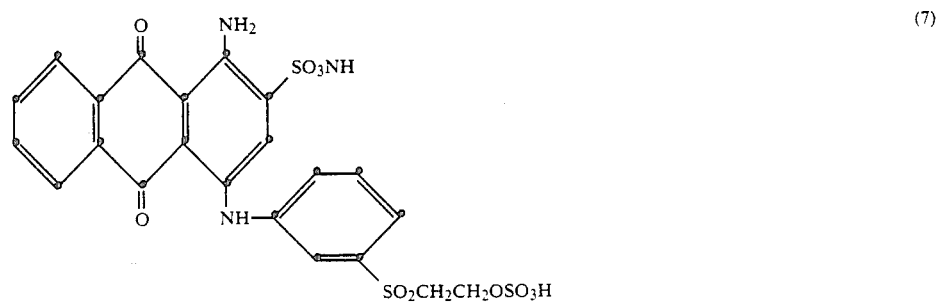
(7)

-continued

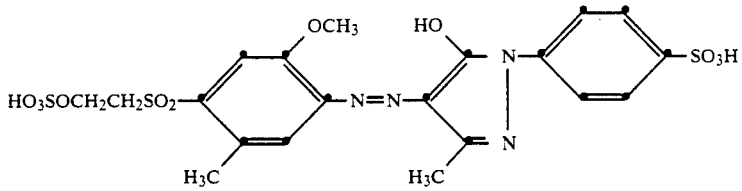

EXAMPLE 1

A polysulfone membrane (UF-membrane) made from a polymer of repeating units of the formula

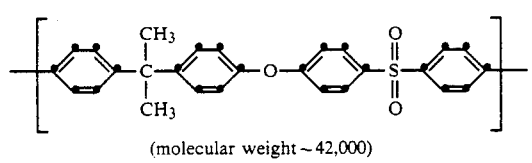

(molecular weight ~42,000)

having a flux/rejection profile for various solutes as described in Table 1, below, (untreated membrane) is modified by the following procedure:

Immersion of the membrane in an aqueous solution of 5% of sodium nitrite and 0.5% polyethyleneimine (PEI) (MW average 30,000) having a pH of 0.5, adjusted by hydrochloric acid, for 30 minutes; removing the membrane from that solution and immersing it for 30 minutes in an aqueous alkaline bath (pH=12); then rinsing the membrane for 30 minutes in tap water and immersing it thereafter in a 2% aqueous suspension of 0° to 4° C. of cyanuric chloride for 10 minutes. Then the membrane is washed for 10 minutes with ice water, immersed in a 10% aqueous solution of PEI (pH 8.5) for 5 minutes, washed for 2 hours, and then placed in an aqueous bath containing 1% of the reactive dye of formula (1) and 10% of sodium chloride for 15 minutes. Finally, the obtained membrane is drip dried for 10 seconds, immersed in a 2% solution of sodium carbonate for 30 minutes at room temperature, and washed for 10 minutes with tap water.

The performance of the so modified membrane is given in Table 1.

TABLE 1

| Solute | Solute concentration % | Untreated membrane Rejection % | Untreated membrane Flux l/m²·h | Modified membrane Rejection % | Modified membrane Flux l/m²·h |
|---|---|---|---|---|---|
| Dye of formula (8) | 1.5 | 42 | 220 | 99.9 | 82 |
| Dye of formula (7) | 2.0 | 60 | 65 | 99 | 42 |
| Congo Red | 1.0 | 30 | 200 | 99.6 | 94 |
| Toluene Sulfonic acid | 1.0 | 12.0 | 95 | 17 | 130 |
| NaCl | 1.0 | 0 | 235 | 5.0 | 116 |
| Dinitrostilbene disulfonic acid | 1.0 | 48 | 130 | 94 | 120 |

Testing conditions: pH-value 6.5; 30° C.; 25 bar; flat sheets.

EXAMPLE 2

A membrane similar to that of Example 1, but instead of a polysulfone, a substrate UF-membrane made from a polyether-ether ketone cast from a 15% solution of 95% sulfuric acid at room temperature and gelled in water, is used, with a rejection to the dye of formula (8) of 20%. This substrate is then modified as indicated in Example 1. The modified membrane shows a flux and rejection to dye of formula (8) (testing conditions: 5% dye solution, 20 bar, pH 7.0) of 99.9% and 65 l/m²·h.

A tubular membrane made of the same polymeric material and modified in the same way, shows a rejection to dye of formula (8) of 99.6%. The rejection to dinitrostilbene disulfonic acid increased from 5% to 94% for the untreated and modified membranes, respectively.

EXAMPLE 3

A tubular polysulfone membrane made from a polymer of repeating units of the formula

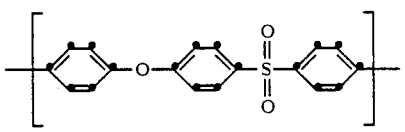

is modified according to the procedure of Example 1. The rejection and flux of the untreated and modified membranes to the dye of formula (8) (testing conditions: 5% dye solution, 20 bar) in a flat test cell is 68%, 122 l/m²·h and 98.6% and 156 l/m²·h, respectively.

EXAMPLE 4

Example 1 is repeated using diazonium salt solutions made from different polymers and monomers other than PEI. These are:
(4.1) Polyvinylamine•HCl (MW 50,000)
(4.2) Poly(vinylamine/vinylsulfonate) (80/20) (MW 40,000)
(4.3) m-Phenylene diamine
(4.4) Polyvinylaniline.

The results are given in Table 2.

TABLE 2

| Diazonium salt | Rejection % | Flux l/m²·h |
|---|---|---|
| (4.1) | 99.1 | 123 |
| (4.2) | 99.9 | 35 |
| (4.3) | 99.8 | 196 |
| (4.4) | 99.2 | 83 |

Testing conditions: 25 bar; 5% solution of dye of formula (8); 30° C.

When Example 4 is repeated, but instead of using PEI as the second coating material a polymer of structures (4.1, 4.2 and 4.4) is used, then all membranes have above 98% rejection to the said test solute.

EXAMPLE 5

Example 4 is repeated with diazonium salt polymers (4.2) with the exception that the substrate UF-membrane is made of polyacrylonitrile instead of polysulfone. After modification the rejection increased to 98.6% from 45% for the untreated membrane.

EXAMPLE 6

Example 1 is repeated, with the exception that the step of the reaction with the charged multifunctional compound (dye of formula (1)) is replaced by a charged multifunctional compound of the formulae (2), (3), (4), (5) or (6). All the resulting membranes have rejections above 98% to dye of formula (8) at 25 bars and 30° C. with fluxes above 50 l/m²•h.

EXAMPLE 7

The modification procedure of Example 1 is repeated using a sulfonated polyvinylidene fluoride of MW of 100,000 instead of polysulfone.

The untreated membrane has a rejection to solute of formula (8) of 65%, and shows a rejection of 97% after modification.

EXAMPLE 8

Example 1 is repeated, using for the second coating polymer polyvinylamine, vinylamine/vinyl sulfonate copolymer, polypiperidine or polyethylenimine (MW 1000), instead of polyethyleneimine (MW 30,000). All new membranes show more than 98% rejections to dye of formula (8), less than 20% to NaCl and fluxes above 500 l/m²•d.

EXAMPLE 9

Example 1 is repeated using polyaramide (an aromatic polyamide) instead of polysulfone to make the substrate. The untreated membrane has a rejection to the dye of formula (8) of 20%. After modification the rejection is 99.5% with a flux of 900 l/m²•d.

EXAMPLE 10

Example 1 is repeated using an aluminum oxide ceramic substrate having a rejection to the dye of formula (8) of 10%. After modification the rejection was 98% with a flux of 200 l/m²•d.

We claim:

1. A semipermeable composite membrane composed of a porous substrate and at least two layers of film-forming polymers coated thereon, which comprises a first layer of monomeric or polymeric diazonium salts, which have been reacted with themselves and with an at least difunctional compound, and a second layer, which is chemically bonded to the first one, of a cross-linked, ionically charged hydrophilic polymer.

2. A composite membrane according to claim 1, wherein the diazonium salts have been reacted with themselves by forming inter- or intra-molecular bonds.

3. A composite membrane according to claim 2, wherein the diazonium salts have been obtained by diazotisation of primary amino group-containing monomeric or polymeric, aromatic or preferably aliphatic compounds.

4. A composite membrane according to claim 3, wherein the primary amino group-containing monomeric or polymeric compounds comprise alkylenediamines, aliphatic ether amines, alkanol amines, anilines, phenylenediamines, aminonaphthalenes, polyethyleneimines, polyvinylamines, vinylamine/vinylsulfonate copolymers, polyvinylanilines, polybenzylamines, polyvinylimidazolines, amino modified polyepihalohydrines, polydiallylamino derivatives, polymers containing piperidine radicals, amino or aminoalkyl substituted polysulfones, amino or aminoalkyl substituted polyaryleneoxides, polyamide-polyamine-epichlorohydrin condensation products or polymers of 2-aminoethylmethacrylate.

5. A composite membrane according to claim 4, wherein the primary amino group-containing monomeric or polymeric compounds comprise aniline, m-phenylene diamine, polyethyleneimines of molecular weights between 1000 and 200,000, polyvinylamines, vinylamine/vinylsulfonate copolymers and polyvinylanilines.

6. A composite membrane according to claim 1, wherein the first layer has been reacted by an at least difunctional, non-ionic compound that contains as functional moieties multiple bonds or epoxide, aziridine, aldehyde, imidate, isocyanate, isothiocyanate, anhydride, hydroxyl, or N-methylol groups, or said at least difunctional compound contains substituents detachable as tertiary amines or preferably as anions.

7. A composite membrane according to claim 6, wherein the at least difunctional compounds are isocyanates, isothiocyanates, or halogenodi- or -triazines with at least two halogen atoms.

8. A composite membrane according to claim 7, wherein the at least difunctional compound is cyanuric chloride or tri- or tetrachloropyrimidine.

9. A composite membrane according to claim 1, wherein the hydrophilic polymer of the second layer is an aliphatic or aromatic polymer containing amino, hydroxyl and/or thiol groups.

10. A composite membrane according to claim 9, wherein the hydrophilic polymer comprises polyethyleneimines, polyvinyl alcohols, cellulose derivatives, polyvinylamines, vinylamine-vinylsulfonate polymers, polybenzylamines, polyvinylanilines, polypiperidines, polyvinylimidazolines, polyvinylmercaptans, polydiallylamine, derivatives, amino modified polyepihalohydrins, polyamide-polyamine-epichlorohydrin condensation products, condensation products of dicyandiamide, amine or ammonium salts and formaldehyde, aminopolysulfones, aminopolyaryleneoxides, aminoalkylpolysulfones, aminoalkylpolyphenyleneoxides, or polymers of 2-hydroxyethyl- or 2-aminoethylmethacrylates.

11. A composite membrane according to claim 10, wherein the hydrophilic polymer has been reacted with ionic, at least difunctional compounds.

12. A composite membrane according to claim 11, wherein the ionic, at least difunctional compounds contain as functional moieties multiple bonds or epoxide, aziridine, aldehyde, imidate, isocyanate, isothiocyanate, anhydride, hydroxyl or N-methylol groups, or said at least difunctional compound contains substituents detachable as anions or tertiary amines, and as ionic groups sulfonic acid, sulfato, carboxylic acid, ammonium, sulfonium or phosphonium groups.

13. A composite membrane according to claim 12, wherein the functional moieties are vinylsulfonyl, halogenated triazinyl, pyrimidyl or 1,4-quinoxalinyl radicals and the ionic groups are sulfonic or carboxylic acid, or ammonium groups.

14. A composite membrane according to claim 1, which comprises
 a first layer of diazonium salts of primary amino groups containing monomeric or polymeric compounds selected from the group consisting of alkylenediamines, aliphatic ether amines, alkanol amines, anilines, phenylenediamines, aminonaphthalenes, polyethyleneimines, polyvinylamines, vinylamino/vinylsulfonate copolymers, polyvinylanilines, polybenzylamines, polyvinylimidazolines, amino modified polyepihalohydrins, polydiallylamino derivatives, polymers containing piperidine radicals, amino or aminoalkyl substituted polysulfones, amino or aminoalkyl substituted polyaryleneoxides, polyamide-polyamine-epichlorohydrin condensation products or polymers of 2-aminoethylmethacrylate, which have been reacted with themselves and with isocyanates, isothiocyanates, halogeno-di- or -triazines with at least two halogen atoms, and a second layer, chemically bonded to the first one, of a hydrophilic polymer selected from the group consisting of polyethyleneimines, polyvinyl alcohols, cellulose derivatives, polyvinylamines, vinylaminevinylsulfonate copolymers, polybenzylamines, polyvinylanilines, polypiperidines, polyvinylimidazolines, polyvinylmercaptans, polydiallylamine derivatives, amino modified polyepihalohydrins, polyamide-polyamine-epichlorohydrin condensation products, condensation products of dicyandiamide, amine or ammonium salts and formaldehyde, aminopolysulfones, aminopolyaryleneoxides, aminoalkylpolysulfones, aminoalkylpolyphenyleneoxides, or polymers of 2-hydroxyethyl- or 2-aminoethylmethacrylates, which has been cross-linked with at least ionic polyfunctional compounds containing as functional moieties vinylsulfonyl, halogenated triazinyl, pyrimidyl or 1,4-quinoxalinyl radicals, and as ionic groups sulfonic or carboxylic acid, or ammonium groups.

15. A composite membrane according to claim 1, wherein the first layer is coated directly onto the porous substrate and the second layer is on the top of the first one.

16. A composite membrane according to claim 1, which is formed as flat sheet, tube or hollow fiber.

17. A process for the preparation of a semipermeable composite membrane according to claim 1, which comprises modifying a porous substrate through a sequence of chemical treatments consisting essentially of steps (a) to (e), wherein step (a) is treating the substrate with a monomeric or polymeric diazonium salt, step (b) is treating the product of step (a) with alkali, step (c) is treating the product of step (b) with an at least difunctional compound, step (d) is coating the product of step (c) with a hydrophilic polymer, and step (e) is cross-linking the product of step (d) with an at least difunctional compound, wherein at least one of the polymer of step (d) or the at least difunctional compound of step (e) contains ionic groups.

18. A process according to claim 16, wherein the porous substrates comprise cellulosics, polyacrylonitriles, copolymers on the basis of acrylonitrile, polyamides, polyvinylchlorides, copolymers on the basis of vinylchloride, epoxy resins, polyaryleneoxides, polycarbonates, polyetherketones, polyether-ether ketones, polyheterocyclics, copolymers containing in part heterocyclic rings, polyvinylidene fluorides, polytetrafluoroethylenes, polyesters, polyimides, aromatic polysulfones, sulfonated derivatives of aromatic polysulfones, polyelectrolyte complexes, polyoledines, or ceramics.

19. A process according to claim 18, wherein step (a) is treating the substrate with diazonium salts which have been obtained by diazotisation of primary amino groups containing monomeric or polymeric compound selected from the group consisting of alkylenediamines, aliphatic ether amines, alkanol amines, anilines, phenylenediamines, aminonaphthalenes, polyethyleneimines, polyvinylamines, vinylamino/vinylsulfonate copolymers, polyvinylanilines, polybenzylamines, polyvinylimidazolines, amino modified polyepihalohydrins, polydiallylamino derivatives, polymers containing piperidine radicals, amino or aminoalkyl substituted polysulfones, amino or aminoalkyl substituted polyaryleneoxides, polyamide-polyamine-epichlorohydrin condensation products or polymers of 2-aminoethylmethacrylate, step (b) is treating the product of step (a) with alkali, step (c) is treating the product of step (b) with an at least difunctional, non-ionic compound that contains as functional moieties multiple bonds or epoxide, aziridine, aldehyde, imidate, isocyanate, isothiocyanate, anhydride, hydroxyl or N-methylol groups or said at least difunctional compound contains substituents detachable as anions or tertiary amines, step (d) is coating the product of step (c) with an aliphatic or aromatic polymer containing amino, hydroxyl and/or thiol groups, and step (e) is cross-linking the product of step (d) with an ionic, at least difunctional compound which contains as functional moieties multiple bonds or epoxide, aziridine, aldehyde, imidate, isocyanate, isothiocyanate, anhydride, hydroxyl or N-methylol groups or said at least difunctional compound contains substituents detachable as anions or tertiary amines, and as ionic groups sulfonic or carboxylic acid, or ammonium groups.

20. A process according to claim 19, wherein the diazonium salts are obtained in situ.

21. A process according to claim 17, wherein the treating step (c) comprises the cross-linking of the product of step (b) and the provision of reactive sites for the chemical binding of the polymer used in step (d).

22. A process according to claim 17, wherein each of the steps (a) to (e) is carried out in an aqueous medium.

23. A process for separating solutes from an aqueous solution which comprises disposing the solution having an osmotic pressure on one side side of a composite membrane according to claim 1 and filtering it through the membrane by applying a hydraulic pressure, being greater than the osmotic pressure of said solution, against said solution and said membrane.

* * * * *